United States Patent
Cardin et al.

(10) Patent No.: US 10,483,733 B2
(45) Date of Patent: Nov. 19, 2019

(54) JOINT STRIP

(71) Applicant: Thomas & Betts International LLC, Wilmington, DE (US)

(72) Inventors: Daniel Cardin, Sainte-Julie (CA); Jonathan Dubé, Richelieu (CA); Yves Boucher, St-Jean-sur-Richelieu (CA)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 14/049,832

(22) Filed: Oct. 9, 2013

(65) Prior Publication Data

US 2014/0099160 A1 Apr. 10, 2014

Related U.S. Application Data (60) Provisional application No. 61/711,509, filed on Oct. 9, 2012.

(51) Int. Cl.
*F16B 5/00* (2006.01)
*H02G 3/06* (2006.01)
*G02B 6/44* (2006.01)
*H02G 3/04* (2006.01)

(52) U.S. Cl.
CPC ......... *H02G 3/0608* (2013.01); *G02B 6/4459* (2013.01); *H02G 3/0418* (2013.01); *H02G 3/0443* (2013.01); *Y10T 403/551* (2015.01); *Y10T 403/559* (2015.01); *Y10T 403/7176* (2015.01)

(58) Field of Classification Search
CPC .. H02G 3/0418; H02G 3/0443; H02G 3/0608; Y10T 403/559; Y10T 403/66; Y10T 403/551; Y10T 403/7176; F16B 5/0028; F16B 5/002; G02B 6/4459
See application file for complete search history.

(56) References Cited

U.S. PATENT DOCUMENTS

| 245,162 | A | * | 8/1881 | Hallenbeck | ............. F16B 12/46 |
| | | | | | 403/219 |
| 479,275 | A | * | 7/1892 | Heywood | ................. E04D 3/08 |
| | | | | | 52/395 |
| 2,150,497 | A | * | 3/1939 | Fernberg | ............. B60R 13/0206 |
| | | | | | 24/458 |

(Continued)

FOREIGN PATENT DOCUMENTS

| EP | 1451910 B1 | 10/2005 |
| WO | 2004005136 A1 | 1/2004 |

(Continued)

*Primary Examiner* — Matthew R McMahon
(74) *Attorney, Agent, or Firm* — Taft Stettinius & Hollister LLP; J. Bruce Schelkopf (57) ABSTRACT

A joint strip including a center trunk, at least one recess formed by at least one upper flange and at least one lower flange for use in bridging a gap in sheet metal, such as in cable trays, cable tray covers, or two pieces of sheet metal. The joint strip may include more than one recess. The one or more recesses are configured to accept, for example, a cable tray surface located at a gap between two cable trays. The joint strip can be inserted between cable trays, for example, without disconnecting the trays from each other or removed in existing cable trays without separating adjacent sections of cable tray or cable tray covers.

13 Claims, 4 Drawing Sheets

(56) References Cited

U.S. PATENT DOCUMENTS

| | | | | |
|---|---|---|---|---|
| 2,230,688 A * | 2/1941 | Irwin | ............... | E01C 11/106 16/7 |
| 2,523,785 A | 9/1950 | Sereno | | |
| 2,708,016 A * | 5/1955 | Penton | ............... | E04B 1/6803 52/396.04 |
| 3,039,232 A * | 6/1962 | Dunn | ............... | E04D 3/36 52/204.591 |
| 3,292,330 A * | 12/1966 | Tennison | ............... | E04B 1/6803 49/495.1 |
| 3,521,332 A * | 7/1970 | Kramer | ............... | 403/188 |
| 3,604,169 A * | 9/1971 | Smith | ............... | E04B 1/6801 52/287.1 |
| 3,627,362 A * | 12/1971 | Brenneman | ............... | E04B 1/49 411/460 |
| 3,640,039 A * | 2/1972 | McKee | ............... | F16B 5/0052 52/281 |
| 3,729,889 A * | 5/1973 | Baruzzini | ............... | E04B 1/6162 52/264 |
| 3,778,537 A * | 12/1973 | Miller | ............... | H01Q 1/1228 174/138 R |
| 3,797,795 A * | 3/1974 | Hemgren | ............... | G09F 1/103 248/316.7 |
| 3,866,374 A * | 2/1975 | Dallen | ............... | E04B 2/967 52/204.593 |
| 4,020,611 A * | 5/1977 | Amos | ............... | E04B 1/6112 49/DIG. 1 |
| 4,046,408 A * | 9/1977 | Ausnit | ............... | B29C 65/58 138/111 |
| 4,338,754 A * | 7/1982 | Woods | ............... | E04B 2/7425 52/393 |
| 4,362,427 A * | 12/1982 | Mass | ............... | E01C 11/126 404/64 |
| 4,533,278 A * | 8/1985 | Corsover | ............... | E01C 11/10 404/65 |
| 4,669,688 A * | 6/1987 | Itoh | ............... | F16L 3/23 24/16 PB |
| 4,703,603 A * | 11/1987 | Hills | ............... | F16B 5/0028 52/582.1 |
| 4,707,892 A * | 11/1987 | Nelson | ............... | 24/336 |
| 4,733,986 A | 3/1988 | Kenning et al. | | |
| 4,903,629 A * | 2/1990 | Maudlin et al. | ............... | 114/361 |
| 5,014,478 A * | 5/1991 | Spring | ............... | E04B 1/6158 52/271 |
| 5,054,256 A * | 10/1991 | Glover | ............... | E04F 13/0803 52/586.2 |
| 5,058,333 A * | 10/1991 | Schwartz | ............... | E04B 7/00 52/16 |
| 5,084,944 A * | 2/1992 | Hileman | ............... | E04F 13/0892 24/297 |
| 5,155,952 A * | 10/1992 | Herwegh | ............... | E04B 1/6803 52/100 |
| 5,297,889 A * | 3/1994 | Crouse | ............... | E06C 1/16 182/127 |
| 5,384,937 A | 1/1995 | Simon | | |
| 5,398,468 A * | 3/1995 | Erickson | ............... | A47F 5/0846 211/94.01 |
| 5,609,435 A * | 3/1997 | Nomura | ............... | F16B 5/002 403/294 |
| 5,642,557 A * | 7/1997 | Clews | ............... | E04B 2/7442 24/298 |
| 5,706,620 A * | 1/1998 | De Zen | ............... | E04B 1/12 52/220.2 |
| 5,752,297 A * | 5/1998 | Ramey | ............... | 24/462 |
| 5,758,987 A * | 6/1998 | Frame et al. | ............... | 403/298 |
| 5,871,189 A * | 2/1999 | Hoftman | ............... | A61G 7/0503 248/229.16 |
| 5,888,017 A * | 3/1999 | Corrie | ............... | E01C 11/106 404/64 |
| 5,976,663 A * | 11/1999 | Davis | ............... | A47B 97/04 248/213 |
| 6,061,884 A | 5/2000 | Ohms et al. | | |
| 6,084,180 A * | 7/2000 | DeBartolo et al. | ............... | 174/95 |
| 6,108,955 A * | 8/2000 | Folsom | ............... | G09F 7/10 40/618 |
| 6,158,915 A * | 12/2000 | Kise | ............... | E04D 13/1606 403/2 |
| 6,186,698 B1 * | 2/2001 | Knapp | ............... | F16B 5/002 403/326 |
| 6,193,434 B1 | 2/2001 | Durin et al. | | |
| 6,219,982 B1 * | 4/2001 | Eyring | ............... | E04B 1/6803 52/393 |
| 6,247,871 B1 | 6/2001 | Nickel et al. | | |
| 6,298,525 B1 * | 10/2001 | Margo | ............... | 24/336 |
| 6,401,939 B1 | 6/2002 | Durin | | |
| 6,402,418 B1 | 6/2002 | Durin et al. | | |
| 6,523,791 B2 * | 2/2003 | Bernard et al. | ............... | 248/68.1 |
| 6,590,154 B1 | 7/2003 | Badey et al. | | |
| 6,631,875 B1 * | 10/2003 | Kampf et al. | ............... | 248/68.1 |
| 6,643,900 B2 | 11/2003 | Jährling | | |
| 6,715,719 B2 * | 4/2004 | Nault et al. | ............... | 248/68.1 |
| 6,729,092 B2 * | 5/2004 | Grosjean | ............... | E04F 19/04 52/393 |
| 6,810,191 B2 * | 10/2004 | Ferris et al. | ............... | 385/134 |
| 6,885,805 B2 * | 4/2005 | Asada | ............... | H02G 3/0487 385/134 |
| 7,041,897 B2 * | 5/2006 | Herzog | ............... | 174/500 |
| 7,041,912 B2 * | 5/2006 | Kadrnoska et al. | ............... | 174/154 |
| 7,055,784 B2 * | 6/2006 | Stigler | ............... | B60R 16/0215 24/16 PB |
| 7,090,226 B1 * | 8/2006 | Trainor | ............... | E06B 3/6202 277/630 |
| 7,131,170 B2 * | 11/2006 | Weaver | ............... | A46B 17/02 24/545 |
| 7,201,352 B2 * | 4/2007 | Kawai | ............... | F16L 3/1075 24/543 |
| 7,381,896 B2 * | 6/2008 | Park | ............... | 174/68.3 |
| 7,441,379 B2 * | 10/2008 | Konstantin | ............... | E04D 3/08 52/200 |
| 7,444,792 B2 * | 11/2008 | Matson | ............... | E04D 12/00 24/336 |
| 7,452,157 B2 | 11/2008 | Deciry | | |
| 7,468,491 B2 | 12/2008 | Deciry et al. | | |
| 7,544,845 B2 | 6/2009 | Lohmer et al. | | |
| 7,608,786 B2 | 10/2009 | Deciry et al. | | |
| 7,665,264 B1 * | 2/2010 | Wolfe | ............... | E04B 1/14 52/586.2 |
| 7,669,807 B2 * | 3/2010 | Stigler | ............... | B60R 11/00 248/229.16 |
| 7,708,491 B2 | 5/2010 | Quertelet et al. | | |
| 7,882,600 B2 * | 2/2011 | Judd | ............... | 24/115 R |
| 7,896,295 B2 * | 3/2011 | Beck | ............... | 248/68.1 |
| 7,903,924 B2 | 3/2011 | Pollard, Jr. et al. | | |
| 7,954,776 B2 | 6/2011 | Davis et al. | | |
| 7,958,682 B2 * | 6/2011 | Elzein | ............... | E06B 5/12 52/203 |
| 7,963,392 B2 * | 6/2011 | Kodi | ............... | 206/340 |
| 8,006,458 B1 * | 8/2011 | Olofsson | ............... | E04F 15/02 52/489.1 |
| 8,132,380 B2 * | 3/2012 | Wilkes, Jr. | ............... | E04B 1/6813 52/393 |
| 8,567,145 B1 * | 10/2013 | Chauncey | ............... | E04B 1/7629 52/396.04 |
| 8,646,237 B1 * | 2/2014 | Takagi | ............... | E04B 1/7629 52/464 |
| 8,915,044 B2 * | 12/2014 | Kline | ............... | F16M 13/00 248/316.8 |
| 9,109,617 B2 * | 8/2015 | Diep | ............... | F16L 3/1075 |
| 2003/0108385 A1 | 6/2003 | Finco et al. | | |
| 2004/0139676 A1 * | 7/2004 | Knauseder | ............... | E04F 15/02 52/578 |
| 2005/0063775 A1 | 3/2005 | Boltz | | |
| 2005/0079756 A1 * | 4/2005 | Kawai | ............... | B60R 16/0215 439/460 |
| 2006/0249300 A1 | 11/2006 | Penichon | | |
| 2007/0164181 A1 | 7/2007 | Deciry et al. | | |
| 2008/0179089 A1 | 7/2008 | Deciry et al. | | |
| 2010/0024339 A1 * | 2/2010 | Tamlyn | ............... | E04B 1/7675 52/459 |

(56) References Cited

U.S. PATENT DOCUMENTS

2011/0080017 A1* 4/2011 Olson ................ B62D 25/2054
  296/57.1
2012/0286110 A1* 11/2012 Hill ............................ 248/74.2
2013/0287484 A1* 10/2013 Phillips .................. F16B 12/24
  403/298

FOREIGN PATENT DOCUMENTS

WO    2006097600 A1    9/2006
WO    2008000543 A1    1/2008

* cited by examiner

JOINT STRIP

CROSS-REFERENCES TO RELATED APPLICATIONS

This application claims the benefit of U.S. Provisional Application No. 61/711,509, filed Oct. 9, 2012, which is incorporated herein by reference in its entirety.

FIELD OF THE INVENTION

The present invention is generally directed toward a joint strip for use with cable trays.

BACKGROUND OF THE INVENTION

Cable trays, which are used to support electric cables as part of a cable management system, frequently employ the use of a U-shaped tray made of sheet metal to support the cables. The cable trays are typically assembled in sections that are attached together using bolted-on splice plates. However, the use of splice plates creates a narrow gap between the cable tray sections and results in sharp edges of sheet metal being exposed. These edges may be sharp enough to gradually strip the outer jacket of any cables that come into contact with the edges of the sheet metal. To prevent such damage to the cables, joint strips are used at the bottom of the cable tray at the junctions between the sections of the cable trays to bridge the gap.

Commonly used joint strips have four legs in an H-shape configuration, such that the joint strip overlaps the upper and lower surface of the sheet metal pieces on either side of the gap. Installation of these joint strips to the bottom of the cable tray is difficult if the cable tray has already been installed. It requires that the splice plate be removed, and adjoining sections of the cable tray be disconnected from each other and pulled far enough apart that the joint strip could be inserted between them. Maneuvering a cable tray that has already been assembled is often very difficult and laborious because the assembled section may be extremely long and already attached to the support structure.

SUMMARY OF THE INVENTION

We disclose a joint strip that can be inserted between cable trays without disconnecting the trays from each other when installed on bottom plates. Alternatively, the joint strip can be inserted between covers on cable trays. One exemplary embodiment of the joint strip has two flanges on a first side that accept a first sheet metal piece, and a single flange and protrusion on a second side for accepting a second sheet metal piece. Another exemplary embodiment of the joint strip has two flanges on a first side that accept a first sheet metal piece, and two flanges on a second side for accepting a second sheet metal piece.

BRIEF DESCRIPTION OF THE DRAWINGS

Further advantages of the invention will become apparent by reference to the detailed description of preferred embodiments when considered in conjunction with the drawings.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

The joint strip is used to bridge the gap between two metal sections of cable tray. This allows cables that are being pulled through the cable tray system to slide over the top surface of the joint strip instead of potentially rubbing against the sharp edges of the sheet metal that make up the bottom of the cable tray. The joint strip overlaps both sections of sheet metal so that electrical cables slide up and over any gap in the sheet metal.

The cover joint strip may also be used to bridge the gap between two metal sections of cable tray cover. In such a configuration, the joint strip serves to prevent items from falling between sections of cover. Although the joint strip is described herein for use with either cable trays or cable tray covers, it should be appreciated that it may be used in any circumstance where a gap in sheet metal pieces needs to be bridged.

The presently disclosed joint strip 1, 101 provides the functionality of previously known joint strips, but is significantly easier to install, especially when used between bottoms of adjacent cable trays that have already been coupled together.

Figure 1:
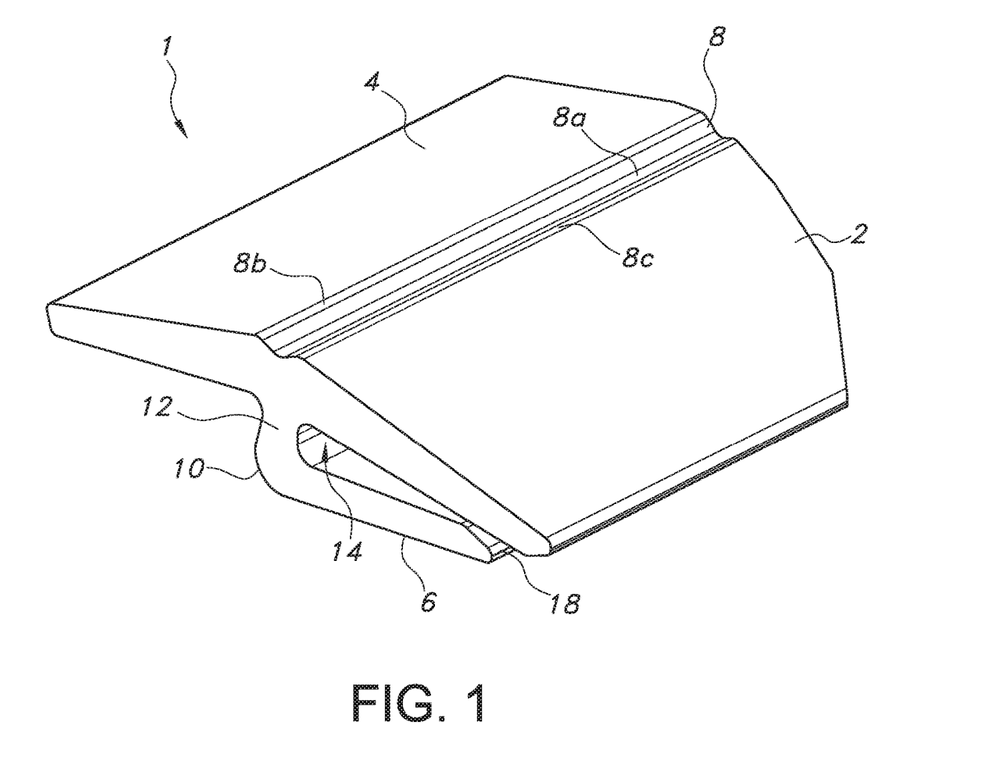
FIG. 1 depicts a perspective view of an embodiment of the joint strip.

Referring to the drawings, FIG. 1 illustrates an exemplary embodiment of the joint strip 1. Joint strip 1 has three flanges extending from a center trunk 12. As used herein, these flanges are referred to as leading upper flange 2, trailing upper flange 4, and lower flange 6.

Figure 3:
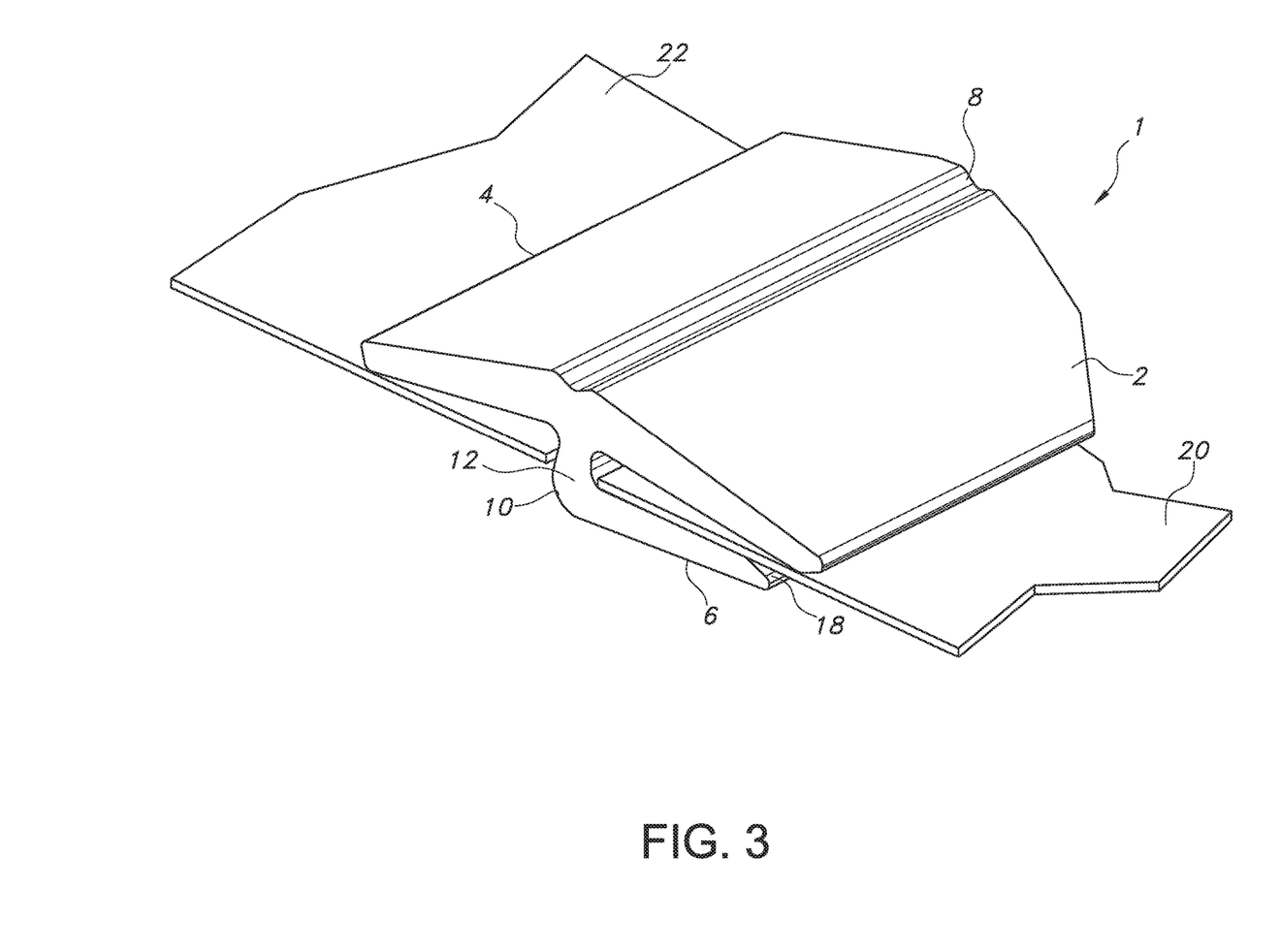
FIG. 3 is a perspective view of an embodiment of the joint strip installed between two sheet metal pieces.

When fully installed into the gap between a first sheet metal 20 and a second sheet metal 22, as shown in FIG. 3, center trunk 12 is located between the sheet metal pieces. These sheet metal pieces are not part of joint strip 1, but represent either the bottom of a cable tray or a cable tray cover. Leading upper flange 2 extends from the upper section of the center trunk 12 toward the upper surface of first sheet metal 20. Trailing upper flange 4 extends outward from the upper section of the center trunk 12 toward the upper surface of the second sheet metal 22. Lower flange 6 extends outward from the lower section of center trunk 12 toward the bottom surface of first sheet metal 20.

The top surface of joint strip 1 also includes center groove 8, directly above center trunk 12. This center groove serves as a flexion point that allows leading upper flange 2 and trailing upper flange 4 to flex relative to center trunk 12. The center groove 8 includes a valley 8a that represents the lowest point within the center groove 8. The highest point of center groove 8 on the opposite side of the center trunk 12 from lower flange 6 is the trailing peak 8b. At the highest point of center groove 8 on the same side of the center trunk 12 as lower flange 6 is the leading peak 8c.

Figure 2:
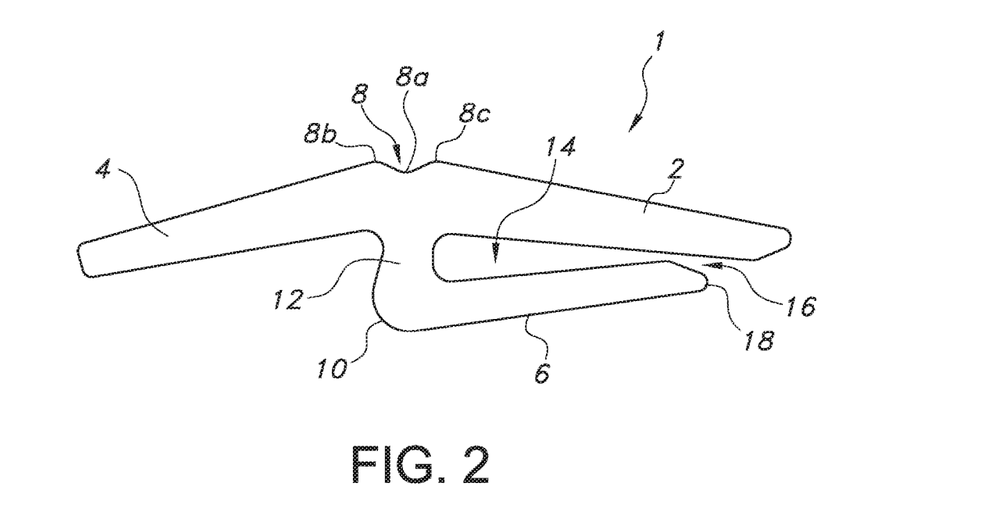
FIG. 2 is a side elevation view of an embodiment of the joint strip.

As will be appreciated from FIG. 2, leading upper flange 2 and lower flange 6 are angled toward each other, such that they almost or slightly come into contact at their ends farthest from the center trunk 12, thus forming a recess 14 configured to accept the edge of the first sheet metal 20. The recess 14 is widest nearest the center trunk 12, and narrowest at the point farthest from the center trunk 12. This narrow section of recess 14 forms the sheet metal entrance 16 through which the first sheet metal 20 passes into the recess 14.

To facilitate the insertion of first sheet metal 20 into sheet metal entrance 16, lower flange 6 may include a lower flange lip 18 that is angled or curved away from the leading upper flange 2 to guide first sheet metal 20 to the sheet metal entrance 16.

On the opposite side of center trunk 12 from lower flange 6 lies trailing protrusion 10. This trailing protrusion 10 slightly extends outward from center trunk 12, such that it creates a resistance when the first sheet metal 20 is located within recess 14, and the center trunk 12 is moved up or down relative to second sheet metal 22. As can be appreciated in FIG. 2, the slight extension outward from center trunk 12 by trailing protrusion 10 is substantially the same distance from center trunk 12 as the trailing peak 8b is from the valley 8a of center groove 8.

Because the cable trays do not have to be uncoupled from each other, installation of the disclosed joint strip 1 into already assembled cable tray systems can easily be performed by a single person. The joint strip 1 is installed into the gap between first sheet metal 20 and second sheet metal 22 by first positioning it, such that the leading upper flange 2 rests on the upper surface of first sheet metal 20, and the edge of first sheet metal 20 is at the sheet metal entrance 16. The joint strip 1 is then pushed in the direction of first sheet metal 20, such that lower flange 6 slides under first sheet metal 20. Lower flange lip 18 ensures that the first sheet metal 20 does not snag on the leading edge of lower flange 6, but instead enters recess 14.

When first sheet metal 20 is first inserted into recess 14, trailing protrusion 10 will rest on the edge of second sheet metal 22. Depressing the top surface of the joint strip 1 along the area near the center groove 8 will force trailing protrusion 10 to slide downward past the edge of sheet metal 22. This may occur by either overcoming friction, or by a slight deformation of the sheet metal or the joint strip 1. In some instances, a soft mallet, such as a rubber mallet, may be used to tap the joint strip 1 into place. The joint strip 1 is fully installed when trailing protrusion 10 is located below the lower surface of the second sheet metal 22, and trailing upper flange 4 is located above the upper surface of second sheet metal 22.

Removal of the joint strip 1 is essentially the opposite of installation. First, the joint strip 1 is pulled upward either at trailing upper flange 4 or along center groove 8, such that trailing protrusion 10 slides up past second sheet metal 22. The joint strip 1 can then be pulled up and away from first sheet metal 20, such that it exits recess 14.

Although joint strip 1 is well suited to being installed between adjacent cable tray sections that are already assembled to each other, it can also be inserted during assembly of a new cable tray system. It should be appreciated that, unlike prior art joint strips, it can easily be removed if needed without disassembling the cable tray system. To install it during assembly of a cable tray system, the joint strip 1 can be placed over first sheet metal 20, such that first sheet metal 20 is located within recess 14. The second sheet metal 22 can then be placed in position, such that second sheet metal 22 is located between trailing upper flange 4 and trailing protrusion 10. The splice connector can then be attached to secure the two sections of cable tray to each other.

The joint strip 1 can be manufactured in different ways, depending on its intended use. In a preferred embodiment, the joint strip 1 is constructed of a plastic, such as nylon, that has been either molded or extruded. Plastic provides flexibility to ease insertion and also provides a softer surface against which the cables can slide. However, the joint strip 1 can be made of almost any firm material, including aluminum or steel.

Figure 4:
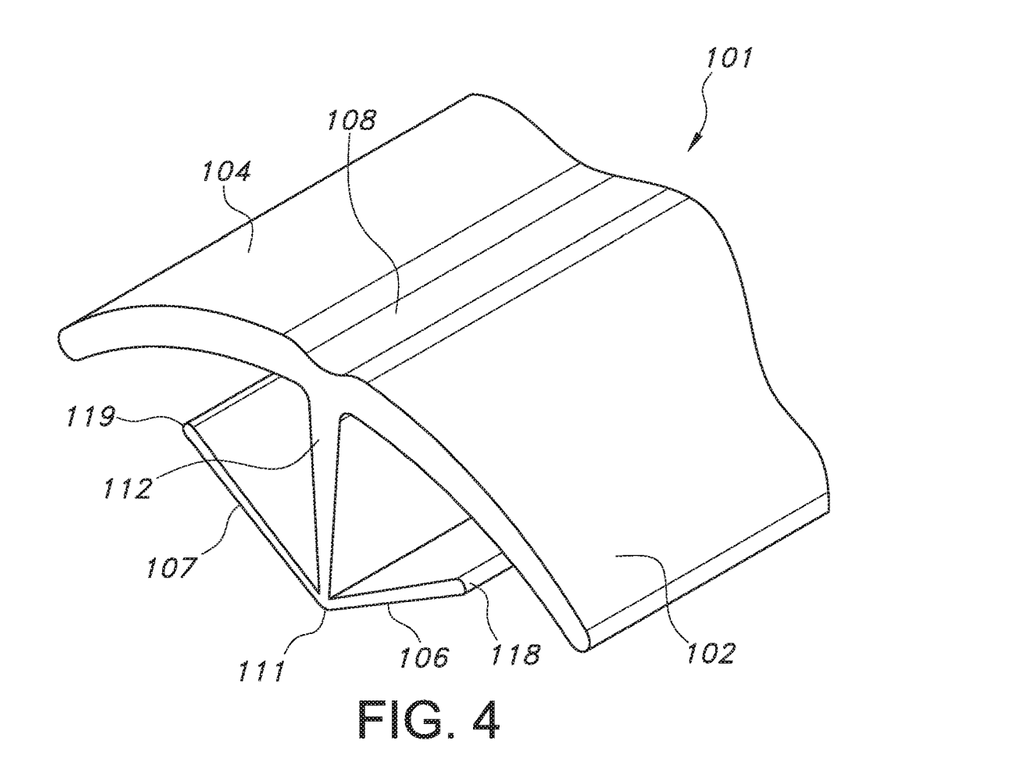
FIG. 4 depicts a perspective view of an embodiment of the joint strip with two flanges on both sides.

FIG. 4 illustrates another exemplary embodiment of the joint strip 101. Joint strip 101 has four flanges extending from a center trunk 112. As used herein, these flanges are referred to as leading upper flange 102, trailing upper flange 104, leading lower flange 106, and trailing lower flange 107.

Figure 5:
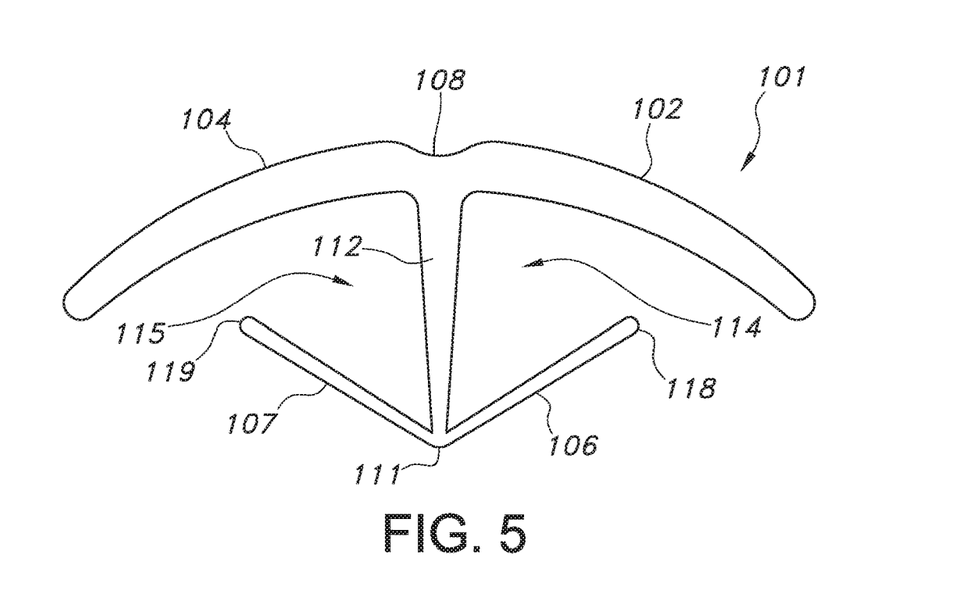
FIG. 5 is a side elevation view of an embodiment of the joint strip with two flanges on both sides.
Figure 6:
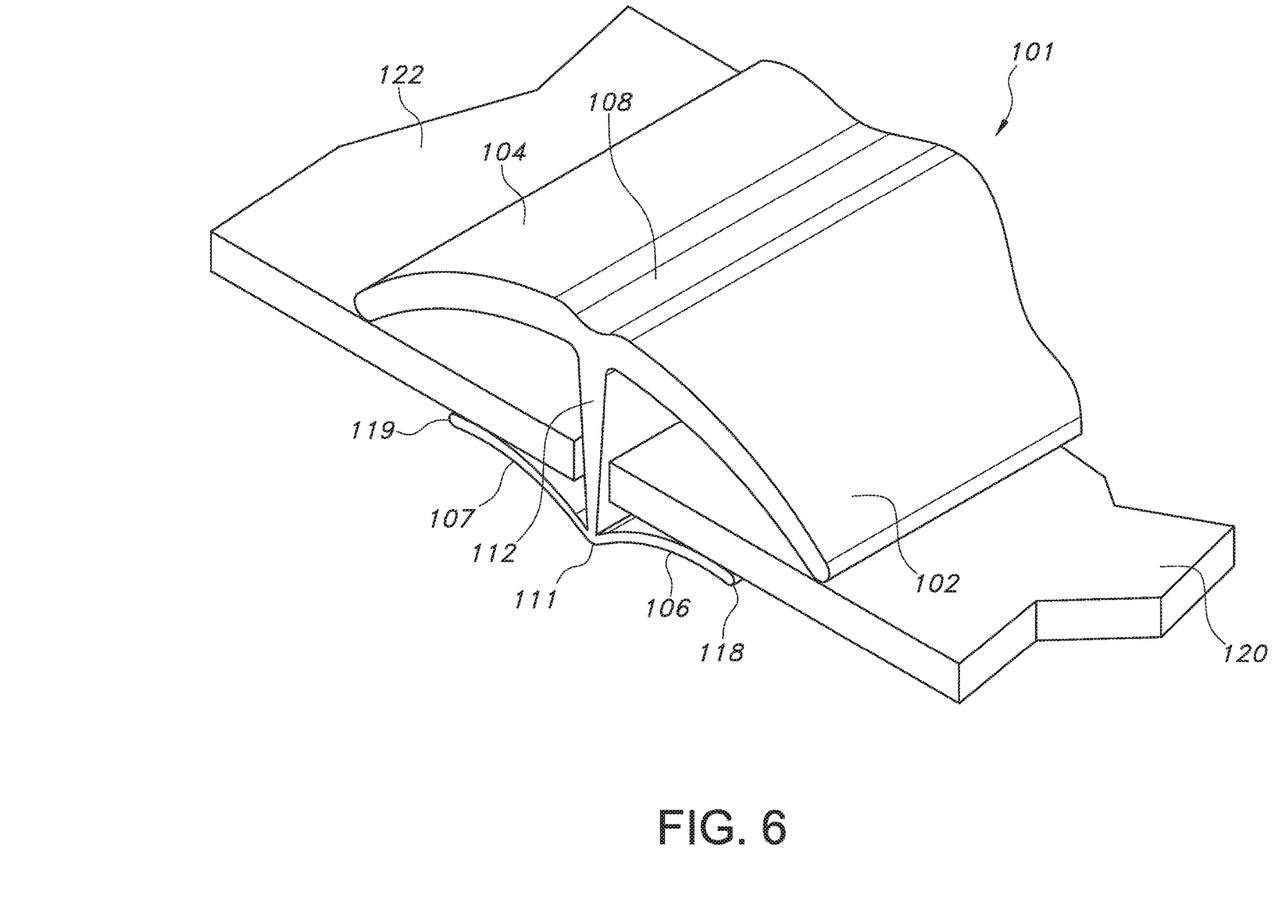
FIG. 6 is a perspective view of an embodiment of the joint strip with two flanges on both sides installed between two sheet metal pieces.

When fully installed into the gap between a first sheet metal 120 and a second sheet metal 122, as shown in FIG. 6, center trunk 112 is located between the sheet metal pieces. These sheet metal pieces are not part of joint strip 101, but represent either the bottom of a cable tray or a cable tray cover. Leading upper flange 102 extends from the upper section of the center trunk 112 toward the upper surface of first sheet metal 120. Trailing upper flange 104 extends outward from the upper section of the center trunk 112 toward the upper surface of the second sheet metal 122. Leading lower flange 106 extends outward from the lower section of center trunk 112 toward the bottom surface of first sheet metal 120. Trailing lower flange 107 extends outward from the lower section of center trunk 112 toward the bottom surface of first sheet metal 122. As best depicted in FIG. 5, leading lower flange 106 and trailing lower flange 107 are configured to be tapered, such that they are thicker at tips 118,119 than they are closer to center trunk 112 and lower apex 111.

The top surface of joint strip 101 also includes center groove 108, directly above center trunk 112. This center groove 108 serves as a flexion point that allows leading upper flange 102 and trailing upper flange 104 to flex relative to center trunk 112.

As will be appreciated from FIG. 5, leading upper flange 102 and leading lower flange 106 are angled toward each other, such that they almost or may slightly come into contact at their ends farthest from the center trunk 112, thus forming a first recess 114 configured to accept the edge of the first sheet metal 120. The first recess 114 is widest nearest the center trunk 112, and narrowest at the point farthest from the center trunk 112. Trailing upper flange 104 and trailing lower flange 107 are also angled toward each other, such that they almost or may slightly come into contact at their ends farthest from the center trunk 112, thus forming a second recess 115 configured to accept the edge of the first sheet metal 122. The second recess 115 is widest nearest the center trunk 112, and narrowest at the point farthest from the center trunk 112.

Because the cable trays do not have to be uncoupled from each other, installation of the disclosed joint strip 101 into already assembled cable tray systems can easily be performed by a single person. For insertion between first sheet metal 120 and second sheet metal 122, the lower apex 111 of central trunk 112 is pressed into the gap between first sheet metal 120 and second sheet metal 122 by pushing the top surface of the joint strip 101 along the area near the center groove 108. The force of pushing lower apex 111 of central trunk 112 into the gap between first sheet metal 120 and second sheet metal 122 causes leading lower flange 106 and trailing lower flange 107 to angle up. In other words, the tip 118 of leading lower flange 106 and the tip 119 of trailing lower flange 107 are forced to become closer to central trunk 112. Once the gap between first sheet metal 120 and second sheet metal 122 has traveled beyond the length of leading lower flange 106 and trailing lower flange 107, leading lower flange 106 and trailing lower flange 107 return to or near their resting position away from central trunk 112. This may occur by either overcoming friction, or by a slight deformation of the sheet metal or the joint strip 101. In some instances, a soft mallet, such as a rubber mallet, may be used to tap the joint strip 101 into place. Thus, first sheet metal 120 has entered first recess 114, and second sheet metal 122 has entered second recess 115. As can be appreciated in FIG. 5, in order for first sheet metal 120 and second sheet metal 122 to enter their respective recesses, leading upper flange 102 and trailing upper flange 104, and/or leading lower flange 106 and trailing lower flange 107, must be flexed away from central trunk 112. To facilitate insertion, leading lower flange 106 and trailing lower flange 107 may be pinched together (toward central trunk 112) at one end or along the entire joint strip 101 before or while pushing the joint strip 101 into the gap between first sheet metal 120 and second sheet metal 122.

Removal of the joint strip 101 is essentially the opposite of installation. First, leading lower flange 106 and trailing lower flange 107 are pinched together (toward central trunk 112) at one end or along the entire joint strip 101, and the joint strip 101 is pulled upward along center groove 108. The joint strip 101 can then be pulled up and away from first sheet metal 120, such that it exits first recess 114.

Although joint strip 101 is well suited to being installed between adjacent cable tray sections that are already assembled to each other, it can also be inserted during assembly of a new cable tray system. It should be appreciated that, unlike prior art joint strips, joint strip 101 can easily be removed if needed without disassembling the cable tray system. To install joint strip 101 during assembly of a cable tray system, the joint strip 101 can be placed over first sheet metal 120, such that first sheet metal 120 is located within first recess 114. The second sheet metal 122 can then be placed in position, such that second sheet metal 122 is located within second recess 115. The splice connector can then be attached to secure the two sections of cable tray to each other.

The joint strip 101 can be manufactured in different ways, depending on its intended use. In a preferred embodiment, the joint strip 101 is constructed of a plastic, such as nylon, that has been either molded or extruded. Plastic provides flexibility to ease insertion and also provides a softer surface against which the cables can slide. However, the joint strip 101 can be made of almost any firm material, including aluminum or steel.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

We claim:

1. A device for bridging a gap between a first rigid object and a second rigid object, the device comprising:
   a. a center trunk having an upper section and a lower section, the lower section comprising a first tapered terminal end, the upper section comprising a second tapered terminal end, the center trunk having a first tapered side and a second tapered side, the first and second tapered sides being on opposing sides of the center trunk and extend linearly upwardly and outwardly from the first tapered terminal end to the second tapered terminal end such that the center trunk has a tapered profile;
   b. a recess shaped and positioned to receive at least a portion of opposing sides of the first rigid object, the recess defined at least in part by a first upper flange that extends directly from the second tapered terminal end of the center trunk, the first tapered side of the center trunk, and a lower flange that extends upwardly directly from the first tapered terminal end of the lower section of the center trunk to a tip of the lower flange, and wherein the device has a rest configuration prior to both receipt of the first rigid object in the recess and placement of the device in the gap at which the first upper flange and the lower flange each extend directly from the center trunk at a generally converging angle towards the other of the first upper flange and the lower flange; and c. a second upper flange directly extending from the second tapered terminal end of the center trunk, wherein the first tapered terminal end includes a trailing protrusion that extends, at least when the device is at the rest position, a distance outwardly and downwardly from the center trunk to create a resistance against the second rigid object when the opposing sides of the first rigid object are located within the recess and the center trunk is moved up or down within the gap such that the device is capable of installation after the first rigid object and the second rigid object are coupled together, the trailing protrusion and the lower flange extending from opposing sides of the center trunk at the first terminal end, wherein the device has a first width between a top surface of the device above the second tapered terminal end of the center trunk and a bottom surface at the first tapered terminal end of the center trunk that is greater than a second width of the device between a top surface of the first upper flange and an outer surface of the lower flange at the tip of the lower flange.

2. The device of claim 1 wherein the lower flange has a beveled edge to facilitate the entrance of the first rigid object into the recess.

3. The device of claim 1 wherein the device is made of plastic.

4. The device of claim 1 wherein the device is made of aluminum.

5. The device of claim 1 wherein the device is made of steel.

6. A device for bridging a gap between a first rigid object and a second rigid object, the device having a rest configuration prior to insertion of the device into the gap and a flexed configuration upon the device bridging the gap, the device comprising:

a. a center trunk configured to fit within the gap, the center trunk comprising an upper section and a lower section, the lower section comprising a first tapered terminal end, the upper section comprising a second tapered terminal end, the center trunk having a first tapered side and a second tapered side, the first and second tapered sides being on opposing sides of the center trunk and extend linearly upwardly and outwardly from the first tapered terminal end to the second tapered terminal end such that the center trunk has a tapered profile;

b. a recess shaped and positioned to receive at least a portion of opposing sides of the first rigid object, the recess being defined at least in part by a first upper flange directly extending from the second tapered terminal end of the center trunk and a lower flange directly extending from the first tapered terminal end of the lower section of the center trunk, the first upper flange and the lower flange outwardly extending from the same side of the center trunk at converging angles toward each other;

c. a second upper flange extending from the upper section of the center trunk in a direction opposite of the first upper flange;

d. a center groove located above the center trunk in a top surface of the device; and e. a trailing protrusion extending, when the device is in the rest configuration, outwardly and downwardly from a side of the first tapered terminal end of the center trunk that is opposite of another side of the first tapered terminal end from which the lower flange directly extends, the trailing protrusion and the lower flange being on opposing sides of the first tapered terminal end, the trailing protrusion configured to, when the opposing sides of the first rigid object are located within the recess, (1) create a resistance against the second rigid object as the center trunk is moved up or down within the gap, and (2) be positioned below a first side of the second rigid object when the device is installed and the second upper flange is positioned above an adjacent second side of the second rigid object, the first and second sides being opposing sides of the second rigid object.

7. The device of claim 6 wherein the lower flange has a beveled edge to facilitate the entrance of a planar portion of the first rigid object into the recess.

8. The device of claim 6 wherein the device is made of plastic.

9. The device of claim 6 wherein the device is made of aluminum.

10. The device of claim 6 wherein the device is made of steel.

11. A device for bridging a gap between a first rigid object and a second rigid object, the device comprising:

a. a center trunk configured to fit in the gap between the first rigid object and the second rigid object, wherein the center trunk comprises a center groove located above the center trunk in a top surface of the device, an upper section, and a lower section, and wherein the center trunk has a tapered profile that includes a first tapered terminal end of the lower section and a second tapered terminal end of the upper section;

b. a recess for accepting at least a portion of opposing sides of the first rigid object, wherein the recess is formed by a first upper flange directly extending from the second tapered terminal end of the center trunk and a lower flange directly extending from the first tapered terminal end of the lower section of the center trunk, the first upper flange and the lower flange extending from the same side of the center trunk at converging angles toward each other;

c. a second upper flange extending from the upper section of the center trunk in a direction opposite of the first upper flange; and d. a trailing protrusion extending outward and downwardly from the first tapered terminal end of the lower section of the center trunk away from the lower flange such that the trailing protrusion creates a resistance against the second rigid object when the opposing sides of the first rigid object are located within the recess and the center trunk is moved up or down within the gap, and such that the device is capable of installation after the first rigid object and the second rigid object are coupled together, wherein the device has a first width between the top surface of the device above the center trunk and a bottom surface at the first tapered terminal end of the center trunk that is greater than a second width of the device between a top surface of the first upper flange and a tip of the lower flange such that, when at least a portion of an inner surface of the second upper flange abuts an upper surface of the second rigid object the trailing protrusion is below the second rigid object.

12. The device of claim 11 wherein the lower flange has a beveled edge to facilitate the entrance of the opposing sides of the first rigid object into the recess.

13. The device of claim 11 wherein the device is made of plastic.

* * * * *